US009128765B2

(12) United States Patent
Jian et al.

(10) Patent No.: US 9,128,765 B2
(45) Date of Patent: Sep. 8, 2015

(54) ASSIGNING RESTORED VIRTUAL MACHINE BASED ON PAST APPLICATION USAGE OF REQUESTING USER

(75) Inventors: Li Rong Jian, Beijing (CN); Jie Qiu, Beijing (CN); Jie Yang, Beijing (CN); Tao Yu, Beijing (CN); Xiao Zhong, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 703 days.

(21) Appl. No.: 13/456,531

(22) Filed: Apr. 26, 2012

(65) Prior Publication Data

US 2013/0047156 A1 Feb. 21, 2013

(30) Foreign Application Priority Data

Apr. 29, 2011 (CN) .......................... 2011 1 0109694

(51) Int. Cl.
G06F 9/455 (2006.01)
G06F 9/50 (2006.01)

(52) U.S. Cl.
CPC ...... *G06F 9/5055* (2013.01); *G06F 2209/5011* (2013.01)

(58) Field of Classification Search
CPC ............ G06F 11/1458; G06F 11/1469; G06F 11/1471; G06F 2201/84; G06F 2201/815; G06F 3/0653; G06F 11/1402; G06F 11/3051; G06F 9/5055
See application file for complete search history.

(56) References Cited

U.S. PATENT DOCUMENTS

| 7,356,679 | B1* | 4/2008 | Le et al. ............................ 713/1 |
| 7,577,722 | B1* | 8/2009 | Khandekar et al. ........... 709/220 |
| 8,464,267 | B2* | 6/2013 | Uyeda et al. .................. 718/105 |
| 2006/0025985 | A1* | 2/2006 | Vinberg et al. ................. 703/22 |
| 2007/0179999 | A1* | 8/2007 | Kamei et al. .................. 707/204 |
| 2009/0177836 | A1* | 7/2009 | Mimatsu ....................... 711/111 |
| 2009/0204961 | A1* | 8/2009 | DeHaan et al. .................. 718/1 |
| 2010/0251172 | A1* | 9/2010 | Oxrieder et al. .............. 715/810 |
| 2011/0029970 | A1* | 2/2011 | Arasaratnam ..................... 718/1 |
| 2011/0055299 | A1* | 3/2011 | Phillips ........................ 707/827 |

FOREIGN PATENT DOCUMENTS

| CN | 101377745 A | 3/2009 |
| CN | 101971162 A | 2/2011 |

* cited by examiner

*Primary Examiner* — Abdullah Al Kawsar
*Assistant Examiner* — James J Lee
(74) *Attorney, Agent, or Firm* — Ido Tuchman; Jennifer R. Davis (57) ABSTRACT

A method of sharing virtual machine resources. The method includes: in response to at least one user logging in to the virtual machine, monitoring file operations taken by the user in the virtual machine; recording the types of file operations; in response to the user logging out from the virtual machine, restoring the virtual machine back to the original state at the time when the user logged in to the virtual machine according to the recorded types of file operations; and in response to receiving a request for virtual machine resources, assigning one of the virtual machines which is idle and restored back to the original state to the requesting user.

15 Claims, 5 Drawing Sheets

ASSIGNING RESTORED VIRTUAL MACHINE BASED ON PAST APPLICATION USAGE OF REQUESTING USER

CROSS REFERENCE TO RELATED APPLICATION

This application claims priority under 35 U.S.C. 119 from Chinese Application 201110109694.9, filed Apr. 29, 2011, the entire contents of which are incorporated herein by reference.

BACKGROUND OF THE INVENTION

1. Field of the Invention

The present invention relates to virtual machines, and more specifically, to a method and apparatus of assigning virtual machine resources.

2. Description of the Related Art

In recent years, a climax of virtual machines and virtualization technology has been set off in the field of computer applications. For virtual machines, virtualization technology is an assembly of the technologies of designing virtual computers. Virtualization technology can enlarge the volume of hardware and simplify the reconfiguration process of software. For example, the virtualization technology of a CPU can simulate multiple CPUs working in parallel using one single CPU and allow multiple operation systems to simultaneously work on a platform, and the applications can operate in spaces independent of each other without influencing each other, in order to significantly improve the work efficiency of the computer. Especially in the environment of cloud computing, it is necessary to provide on-demand computing for individuals and enterprises. Normally, cloud computing is considered to involve the following levels of service: Infrastructure as a Service (IaaS), Platform as a service (PaaS) and software as a service (SaaS). Because virtualization technology has the ability for on-demand configuration and dynamic migration, it becomes the key to achieve dynamicity and scalability for cloud computing. Major corporations and business organizations are beginning to use virtualization technology to cut down the number of physical machines needed which lowers costs and reduces energy and space requirements. In the meantime, however, virtual machine assign technology presents challenges to data backup.

According to the prior art, when a user makes a request for virtual machine resources, service providers will create a new virtual machine with a base image for the user. When the user logs out from the virtual machine, the entire virtual machine needs to be backed up as a whole, which includes the operating system, application software and user data. However, it takes a long time and a large amount of space to backup the entire virtual machine as well as a long time to restore it. This costs service providers more storage resources and more time. Accordingly, users also need to pay more for storage resources.

Therefore, it is necessary to provide an efficient virtual machine resource assign mechanism.

BRIEF SUMMARY OF THE INVENTION

In order to overcome these deficiencies, the present invention provides a method of assigning virtual machine resources, including: monitoring, in response to at least one user logging in to a virtual machine, file operations taken by the at least one user in the virtual machine; recording types of the file operations; restoring, in response to the at least one user logging out from the virtual machine, the virtual machine back to an original state at a time when the at least one user logged in to the virtual machine according to the recorded types of file operations; and assigning, in response to receiving a request for virtual machine resources, one of the restored virtual machines which is idle to a requesting user.

According to another aspect, the present invention provides. An apparatus for assigning virtual machine resources, including: a monitor module configured to, in response to at least one user logging in to a virtual machine, monitor file operations taken by the at least one user in the virtual machine; a record module configured to record the types of the file operations; a virtual machine restore module configured to, in response to the at least one user logging out from the virtual machine, restore the virtual machine back to an original state at a time when the at least one user logged in to the virtual machine according to the recorded types of file operations; and a virtual machine assign module configured to, in response to receiving a request for virtual machine resources, assign one of restored virtual machines which is idle to a requesting user.

BRIEF DESCRIPTION OF THE SEVERAL VIEWS OF THE DRAWINGS

The invention itself, preferred embodiments and the objective and advantages of the invention will be better understood with reference to the following detailed description of the illustrative embodiments in conjunction with the drawings, wherein.

DETAILED DESCRIPTION OF THE PREFERRED EMBODIMENT

A method and apparatus of enabling content sharing between mobile terminals according to an embodiment of the invention will be described with reference to the drawings in the following, which will help the reader to better understand the purpose and advantages of the present invention.

The core idea of the present invention is as follows: after the user logs out from the virtual machine, the service provider will not kill the virtual machine, but restore the virtual machine back to the original state at the time when the user logged in according to the recorded file operation taken by the user on the virtual machine. In this way, when other users request virtual machine resources, there is no need to create new virtual machines for other users. Instead, virtual machines which have been restored to their original state with the basic image and installed applications will be assigned to other users. The users only need to install applications which are not on the virtual machines as required, so as to enable different users to share virtual machine resources. As to data backup, there is no need for virtual machine-level data backup, and only the user-level backup is necessary. While restoring the user's virtual machine using this environment it is only needed to import the users personal data, which simplifies the restore process.

Figure 1:
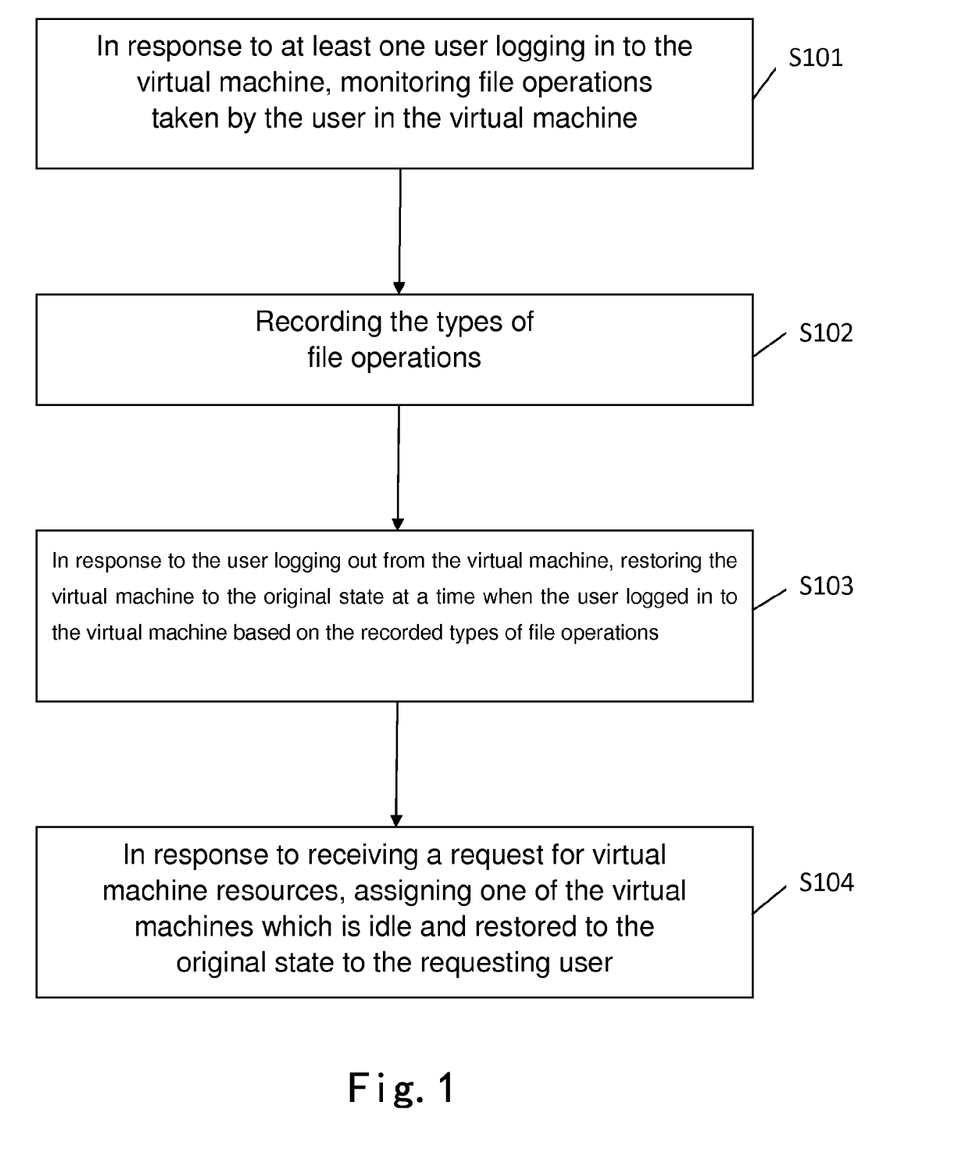
FIG. 1 depicts a method of assigning virtual machine resources according to an embodiment of the present invention.

FIG. 1 shows a method of enabling virtual machine resource sharing according to an embodiment of the invention, including: in step S101, in response to at least one user logging on a virtual machine, monitoring file operations taken by the user on the virtual machine; in step S102, recording the type of file operations; in step S103, in response to the user logging out from the virtual machine, restoring the virtual machine back to the original state at the time when the user logged on the virtual machine according to the recorded types of file operations; and in step S104, in response to receiving a request for virtual machine resources, assigning one of the virtual machines which is idle and restored back to the original state to the requesting user.

In step S101, in response to at least one user logging on a virtual machine, a file operation taken by the user on the virtual machine is monitored. Specifically, the user sends a request to service providers asking for virtual machine resources and service providers assign virtual machine resources to the user. After the user logs in to a virtual machine, file operations taken by the user on the virtual machine will be monitored.

In step S102, the types of file operations are recorded, further including executing a local backup of the original files in accordance with the types of file operations, and further including recording the local backup path of the original files in response to whether the types of file operations are deletion or modification. Specifically, according to one embodiment of the present invention, the type of file operation is recorded in the user file operation table, the information recorded therein includes: user identification ID, file name, type of operation as well as the backup path of the original file. Table 1 shows an example of the user file operations table. From Table 1 it can be seen that it is recorded that user 1 performed a modify operation to file 1, a delete operation to file 2, and created file 3. As to the situations of modify and delete operations, a local backup of the original files are correspondingly executed and the local backup path of the original file path is recorded.

TABLE 1

| User ID | File name | Operation | Backup path of the original files |
| --- | --- | --- | --- |
| User1 | File 1 | modify | c:\temp\usr1\file1 |
| User1 | File 2 | delete | c:\temp\usr1\file2 |
| User 1 | File 3 | create | |

In step S103, in response to the user logging out from the virtual machine, the virtual machine is restored back to the original state at the time when the user logged in to the virtual machine based on the recorded types of file operations. Specifically, the virtual machine is restored back to the original state at the time when the user logged in to the virtual machine based on the recorded types of file operations using the backup of the original files. In response to the user logging out from the virtual machine, the recorded types of file operations are checked and restoring is performed depending on the types of various operations. If the types of file operations indicate deletion of original files, then original files are restored using a backup of the original files; if the types of file operations indicate modification of original files, the modified original files are replaced by a backup of the original files; and if the types of file operations indicate creation of files, the created files are deleted, by which the marks left in the virtual machine by the user are cleaned and the virtual machine is restored back to the original state at the time when the user logged in to the virtual machine. An embodiment of the invention further includes executing a backup of user's personal data in a virtual machine, for use in data recovery by the user. Taking Table 1 for example, since User 1 has modified original file 1, it is only necessary to get original file 1 according to the save path for the backup of original file 1 and restore it; since User 1 has modified original file 2, original file 2 is retrieved according to the save path for the backup of original file 2 and the current file is replaced by original file 2. As to the created file 3, it's only necessary to delete it in order to restore the files in the virtual machine back to the original state at the time when the user logged in to the virtual machine.

In step S104, in response to receiving the request for virtual machine resources, one of the virtual machines which is idle and restored back to the original state is assigned to the requesting user. Specifically, requests for virtual machine resources from other users are received and the existence of idle virtual machines is known after the query. Under such a situation, there is no need for the user to re-create a new virtual machine, but only to assign a virtual machine which is idle and restored back to the original state at the time when the user logged in to the requesting user, which enables different users to share virtual machine resources. In a cloud environment, based on the base image and the list of applications in library, a virtual machine is created for the user. For the users with the same base image (for example, the Linux® operating system), many applications they use are the same, and the cloud provider can provide the same resources to different users and enable different users to share the virtual machine resource. After a user logs in to a virtual machine, according to users' demand, the service provider installs applications which have not been installed in the virtual machine from the application library, and the user further loads personal data to the virtual machine to build a virtual machine running environment, which meet the individual needs.

An embodiment of the present invention further includes recording applications used by the user in a virtual machine, for example, recording applications used by the user in a virtual machine in the user application information table, the information recorded therein including: user identification ID, virtual machine identification ID and the used applications. Table 2 shows an example of the user application information table, wherein User 1 used applications 1, 2 and 3 in a virtual machine VM1, and User 2 used applications 3, 4 and 5 in a virtual machine VM2.

TABLE 2

| User ID | VM ID | Applications |
| --- | --- | --- |
| User 1 | VM1 | Application 1, 2, 3 |
| User 2 | VM2 | Application 3, 4, 5 |

An embodiment of the present invention further includes recording applications running on an idle virtual machine, such as recording applications running on an idle virtual machine in a virtual machine application record table. Table 3 shows an example of the virtual machine application record table, wherein it is recorded that applications 1, 2 and 3 are running on an idle virtual machine VM1, and that applications 3, 4 and 5 are running on an idle virtual machine VM2.

TABLE 3

| Idle VM | Application |
|---|---|
| VM2 | Applications 1, 2 |
| VM3 | Applications 3, 4, 5 |

According to one embodiment of the present invention, assigning one of the idle virtual machines to other users by the service provider according to a request for virtual machine resources from other users further includes: checking whether other users have used a virtual machine, which can be done by inquiring the user application information table according to the embodiment of the invention; in response to other users having used a virtual machine, comparing the recorded applications used by the user in a virtual machine with the ones running on an idle virtual machine to determine an idle virtual machine that best matches, which is then assigned to the user. According to one embodiment of the present invention, taking Tables 2 and 3 for example, if user 1 requests virtual machine resources, and the service provider learns that user 1 has used virtual machine VM1 after a query through Table 2, the server provider then compares the applications 1, 2 and 3 used by the user with the ones running on idle virtual machines VM2 and VM3 recorded in Table 3. By comparison, it is determined that the applications running on VM2 best matches the user's needs, so the virtual machine VM2 is assigned to the user. If there is a limited number of idle virtual machines and the last user's applications running on the assigned virtual machines do not match the requesting user's needs, the service provider can, according to the status of resources, selectively uninstall applications running on the virtual machines in order to provide the requesting user the applications required for installation.

Figure 2:
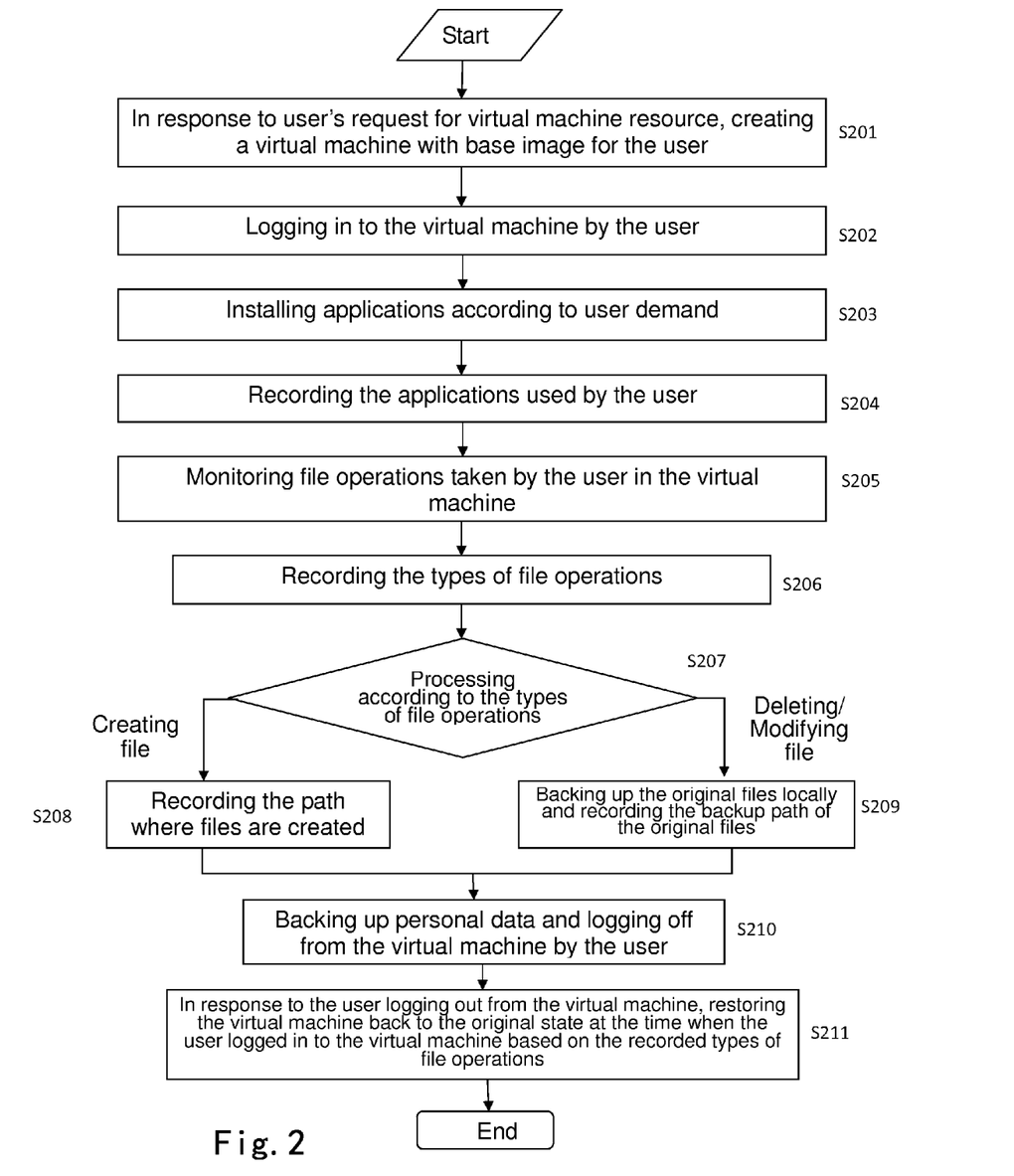
FIG. 2 depicts the workflow of creating a virtual machine for the user according to an embodiment of the present invention.

FIG. 2 shows a workflow, according to an embodiment of the invention, of creating a virtual machine for the user. Assuming the user is an initial user who logs in to a virtual machine, and no other user has logged in before, it is necessary to create a virtual machine for the user. In step S201, in response to the user's request for virtual machine resources, a virtual machine with a base image is created for the user; in step S202, the user logs in to the virtual machine; in step S203, the user installs applications on demand, for example, the user can download applications from the application library and install the applications; in step S204, applications used by the user are recorded; in step S205, file operations taken by the user in a virtual machine are monitored; in step S206, the types of file operations are recorded; and in step S207, processing is conducted according to the type of file operations. If the types of file operations are to create a file, then in step S208, the path for creating the file is recorded; if the types of file operations are to delete or modify a file, in step S209 a backup of the original files is executed locally and the backup path of the original files is recorded. In step S210, a backup of the user's personal data is executed and the user logs out from the virtual machine; In step S211, in response to the user logging out from the virtual machine, the virtual machine is restored back to the original state at the time when the user logged in to the virtual machine according to the recorded types of file operations. The process of restoring to the original state follows the description of Step 103 in FIG. 1. At this point the virtual machine is idle.

Figure 3:
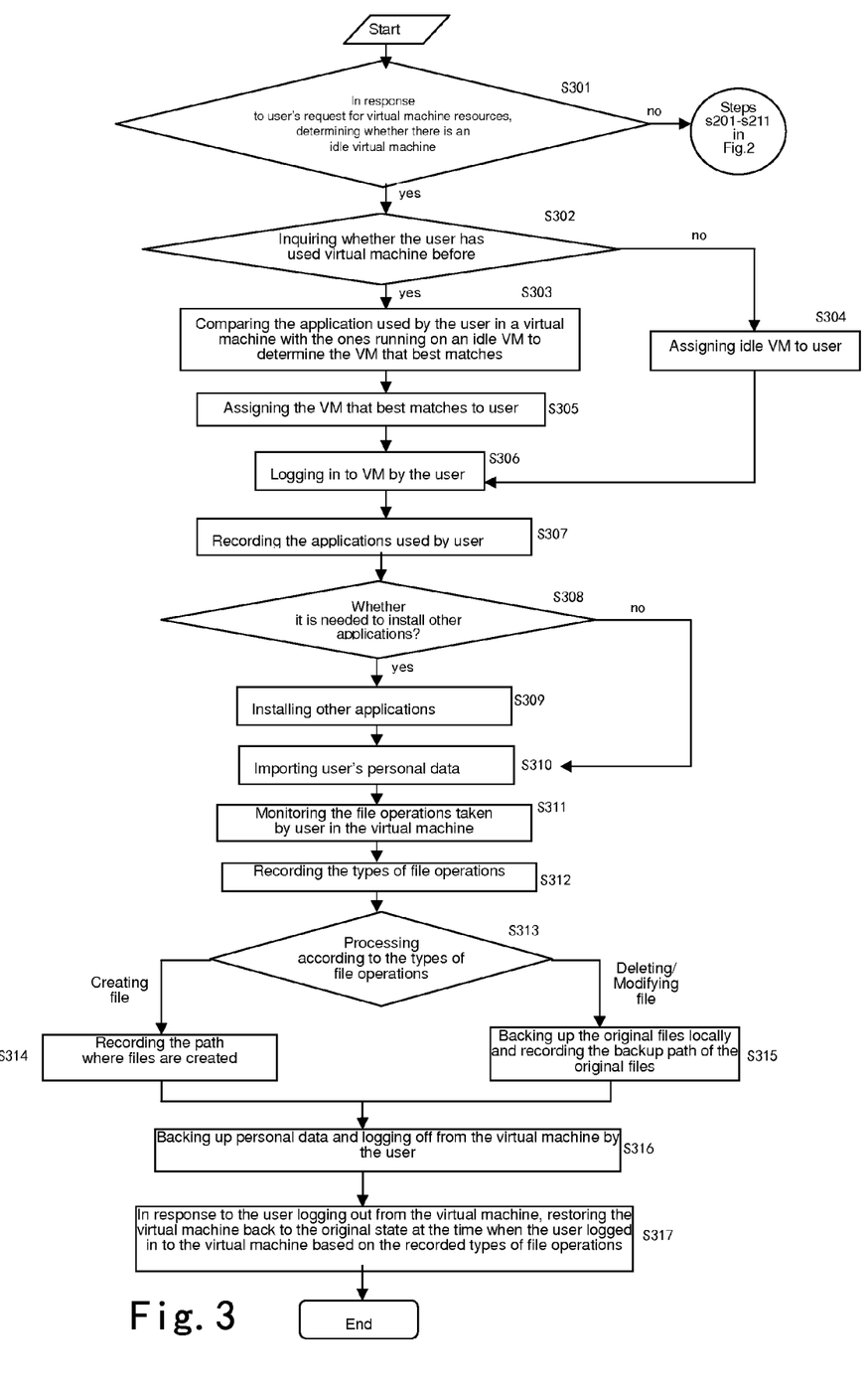
FIG. 3 depicts the workflow of assigning a virtual machine to the user according to an embodiment of the present invention.

FIG. 3 shows a workflow, according to an embodiment of the invention, of assigning a virtual machine for a user. In step S301, in response to the user's request for virtual machine resources, it is determined whether there is an idle virtual machine. If there is no idle virtual machine, the steps S201-211 in FIG. 2 are performed, creating a new virtual machine for the user. If there is an idle virtual machine, then it is further inquired in step S302 whether the user has used the virtual machine before. If the query result is "No", in step S304 the user is assigned to a idle virtual machine and step S306 is proceeded to; if the query result is "Yes", then in step S303, the applications used by the user in a virtual machine are compared with the ones running on an idle virtual machine to determine an idle virtual machine that best matches. According to embodiments of the invention, the applications used by the user can be learned by inquiring the user application information table, and the applications running on the virtual machine can be learned by inquiring the virtual machine application record table. In step S305, the virtual machine that best matches is assigned to the user. In step S306, the user logs in to the virtual machine. In step S307, applications used by the user are recorded. In step S308, it is determined whether it is necessary to install other applications, by comparing the applications used by the user with the ones running on an idle virtual machine. If the result is "yes", step S309 is proceeded to and other applications are installed. If the result is "No", then the process advances to step S310 wherein user's data is imported and the user's virtual machine using environment is restored. Compared to existing technologies of heavyweight data backup which need to backup the entire virtual machine data, a backup of personal data enables a lightweight data backup. In step S311, file operations taken by the user in the virtual machine are monitored; in step S312, the types of said file operations are recorded. In step S313, processing is conducted according to the types of file operations. If the types of file operations are to create a file, in step S314, the path for creating the file is recorded. If the types of file operations are to delete or modify a file, in step S315, a backup of the original files is executed and the backup path of the original files is recorded. In step S316, a backup of the user's personal data is executed and the user logs out from the virtual machine. In step S317, in response to the user logging out from the virtual machine, the virtual machine is restored back to the original state at the time when the user logged in to the virtual machine according to the recorded types of file operations. At this point the virtual machine is idle.

Figure 4:
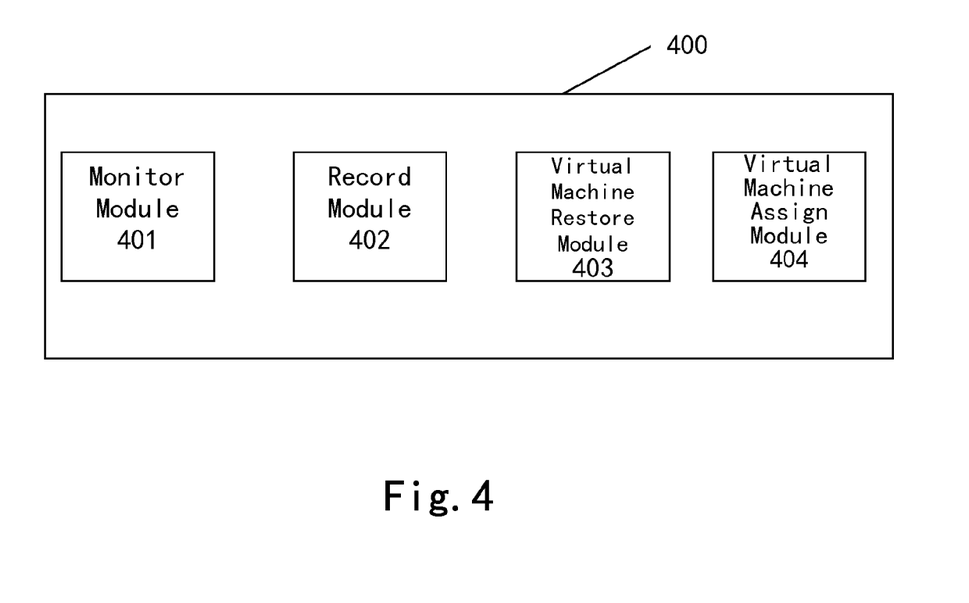
FIG. 4 depicts an apparatus of assigning virtual machine resources according to an embodiment of the present invention.

Based on the same inventive concept, the invention provides an apparatus for assigning virtual machine resources. FIG. 4 shows an apparatus 400 for assigning virtual machine resources according to an embodiment of the invention, including: monitor module 401, configured to, in response to at least one user logging in to a virtual machine, monitor file operations taken by said user in the virtual machine; record module 402, configured to record the types of file operations; virtual machine restore module 403, configured to, in response to the user logging out from the virtual machine, restore the virtual machine back to the original state at the time when the user logged in to the virtual machine according to the recorded types of file operations; and virtual machine assign module 404, configured to, on receiving requests for virtual machine resources, assign one of the idle virtual machines to the requesting user. The monitor module 401, record module 402 and virtual machine restore module 403 can be realized in a virtual machine as a plug-in.

According to one embodiment of the present invention, record module 402 is further configured to locally execute a backup of the original files according to the types of file operations, and virtual machine restore module 403 is configured to restore the virtual machine back to the original state at the time when the user logged in to the virtual machine according to the recorded types of file operations using the backup of the original files. According to one embodiment of the present invention, record module 402 is further configured to, in response to the types of file operations being to delete or modify files, execute a backup of the original files and record the backup path of the original files; and in response to the types of file operations being to create a file, record the path for creating the file.

According to one embodiment of the present invention, virtual machine restore module 403 is further configured to: in response to the type of file operations being to delete files, use the backup of the original files to recover the original files; in response to the types of file operations being to modify files, use the backup of the original files to replace the modified original files; and in response to the type of file operations being to create files, delete the created files. According to an embodiment of this invention, the virtual machine restore module is further configured to backup the user's personal data in the virtual machine.

According to one embodiment of the present invention, record module 402 is further configured to record applications used by the user in a virtual machine. According to one embodiment of the present invention, record module 402 is further configured to record applications running on an idle virtual machine.

According to one embodiment of the present invention, virtual machine assign module 404 is further configured to check whether other users have used a virtual machine, and in response to other users having used a virtual machine, compare the recorded applications used by the user in a virtual machine with ones running on an idle virtual machine to determine an idle virtual machine that best matches, which is then assigned to the user.

Figure 5:
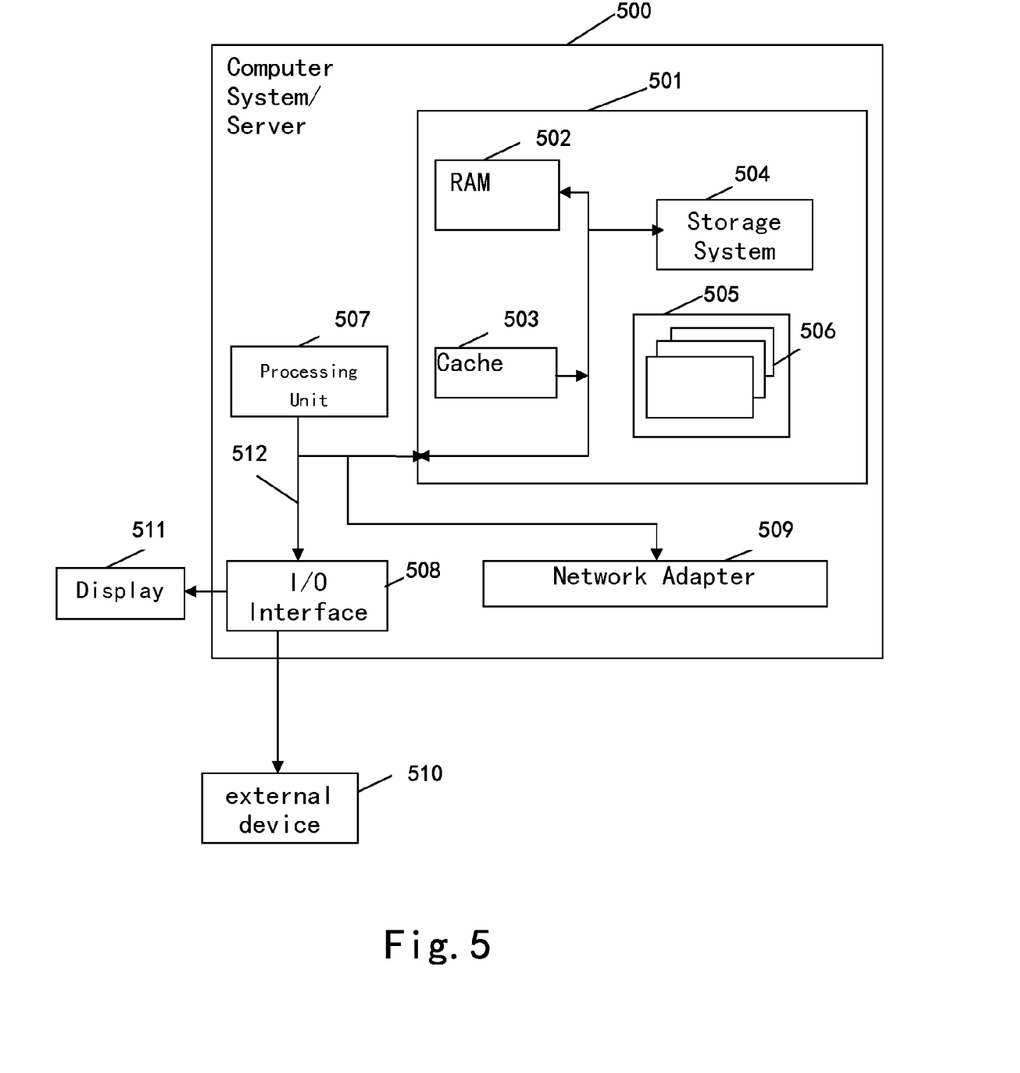
FIG. 5 depicts a cloud computing node according to an embodiment of the present invention.

Referring now to FIG. 5, a schematic of an example of a cloud computing node suitable for performing an embodiment of this invention is shown. The cloud computing node is only one example of a suitable cloud computing node and is not intended to provide any limitation as to the scope of use and functionality of embodiments of the invention described herein. The cloud computing node is capable of being implemented and/or performing any of the functionality set forth hereinabove.

In the cloud computing node of FIG. 5 there is a computer system/server 500, which is operational with numerous other general purpose or special purpose computing environments or configurations. Examples of well-known computing systems, environments, and/or configurations that may be suitable for use with computer system/server 500 include, but are not limited to, personal computer systems, server computer systems, thin clients, thick clients, hand-held or laptop devices, microprocessor-based systems, set top boxes, programmable consumer electronics, network PCs, minicomputer systems, mainframe computer systems, and distributed cloud computing environments that include any of the above systems or devices, and the like.

Computer system/server 500 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 500 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 500 in the cloud computing node is shown in the form of a general-purpose computing device. The components of computer system/server 500 may include, but are not limited to, one or more processors or processing units 507, a system memory 501, and a bus 512 that couples various system components including system memory 501 and processor 507.

Bus 512 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MAC) bus, Enhanced ISA (EISA) bus, Video Electronics Standards Association (VESA) local bus, and Peripheral Component Interconnects (PCI) bus.

Computer system/server 500 typically includes a variety of computer system readable media. Such media may be any available media that is accessible by computer system/server 500, and it includes both volatile and non-volatile media, removable and non-removable media.

System memory 501 can include computer system readable media in the form of volatile memory, such as random access memory (RAM) 502 and/or cache memory 503. Computer system/server 500 may further include other removable/non-removable, volatile/non-volatile computer system storage media. By way of example only, storage system 504 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 512 by one or more data media interfaces. As will be further depicted and described below, memory 501 may include at least one program product having a set (e.g., at least one) of program modules that are configured to carry out the functions of embodiments of the invention.

Program/utility 505, having a set of (at least one) program modules 506, may be stored in memory 501. For example, such program modules 506 can be but are not limited to, an operating system, one or more application programs, other program modules, and program data. Each of the operating systems, one or more application programs, other program modules, and program data or some combination thereof, may include an implementation of a networking environment. Program modules 506 generally carry out the functions and/or methodologies of embodiments of the invention as described herein.

Computer system/server 500 may also communicate with one or more external devices 510 such as a keyboard, a pointing device, a display 511, etc.; one or more devices that enable a user to interact with computer system/server 500; and/or any devices (e.g., network card, modem, etc.) that enable computer system/server 500 to communicate with one or more other computing devices. Such communication can occur via Input/Output (I/O) interfaces 508. Additionally, computer system/server 500 can communicate with one or more networks such as a local area network (LAN), a general wide area network (WAN), and/or a public network (e.g., the Internet) via network adapter 509. As depicted, network adapter 509 communicates with the other components of computer system/server 500 via bus 512. It should be understood that although not shown, other hardware and/or software components could be used in conjunction with computer system/server 500. Examples include, but are not limited to: microcode, device drivers, redundant processing units, external disk drive arrays, RAID systems, tape drives, and data archival storage systems, etc.

It is appreciated that at least some aspects of this invention can be performed by a program product. A program defining function as to this invention can be conveyed to a data storage system or computer system via various signal carrying medias including but not limited to non-writable storage media (e.g. CD-ROM), writable storage media (e.g. software, hardware drive, read/write CD ROM, light medium) and communication media including, e.g., a computer and an Ethernet device. Therefore, it is appreciated that, such kind of signal carrying media, when carrying or encoded with computer readable instructions to manage the method functions in this invention, represent alternative embodiments of this invention. This invention can be performed by hardware, software, firmware or any combination thereof. This invention can be performed in a computer system in a central way or in distribution way where various components are distributed among several interconnected computer systems. Any computer systems or other apparatuses suitable for performing methods described herein are proper. In embodiments, this invention is performed in a combination of computer software and common application computer hardware, where the computer programs, when loaded and executed, controls the computer system to execute the method of this invention or constitutes the system of this invention.

The description of preferred embodiments of the present invention has been presented for purposes of illustration and description, but is not intended to be exhaustive or limited to the invention in the form disclosed. Many modifications and variations will be apparent to those of ordinary skill in the art who will benefit from the above teachings. Such modifications and changes obvious to those skilled in the art are included in the scopes defined by the appended claims.

What is claimed is:

1. A method of assigning virtual machine resources wherein the virtual machine resources includes virtual machines, the method comprising:
   monitoring, in response to a user logging in to a virtual machine, file operations performed on one or more files by said user in said virtual machine;
   recording types of said file operations;
   restoring, in response to said user logging out from said virtual machine, said virtual machine back to an original state using backup of original files available at a time when said user logged in to said virtual machine; and
   assigning, in response to receiving a request for virtual machine resources from a requesting user, one of said restored virtual machines which is idle based on checking whether said requesting user has used a virtual machine before, and comparing one or more applications previously used by said requesting user in said virtual machine with one or more applications running on said restored virtual machines to determine a virtual machine that best matches needs of said requesting user.

2. The method according to claim 1, wherein:
   recording types of said file operations further includes executing a local backup of original files; and
   restoring said virtual machine back to the original state further includes restoring said virtual machine back to the original state using said backup of original files.

3. The method according to claim 2, wherein executing said local backup of original files comprises:
   in response to said type of file operations being at least one of deletion or modification, executing a backup of said original files and recording a backup path of said original files; and
   in response to said type of file operations being creation, recording a path where said files are created.

4. The method according to claim 2, wherein restoring said virtual machine back to the original state further comprises:
   in response to said type of file operations being deletion, using said backup of said original files to recover said original files;
   in response to said type of file operations being modification, using said backup of said original files to replace said modified original files; and
   in response to said type of file operations being creation, deleting said created files.

5. The method according to claim 2, further including recording applications used by said user in said virtual machine.

6. The method according to claim 5, further including recording applications running on said virtual machine which is idle and restored back to the original state.

7. The method according to claim 1, wherein restoring said virtual machine back to the original state further includes executing a backup of said user's personal data in said virtual machine.

8. The method according to claim 1, wherein the types of said file operations are one of creating a file, modifying the file, and deleting the file.

9. An apparatus for assigning virtual machine resources wherein the virtual machine resources includes virtual machines, the apparatus comprising:
   a computer processing unit;
   a monitor module executed by the computer processing unit and configured to, in response to a user logging in to a virtual machine, monitor file operations performed on one or more files by said user in said virtual machine;
   a record module configured to record the types of said file operations;
   a virtual machine restore module configured to, in response to said user logging out from said virtual machine, restore said virtual machine back to an original state using backup of original files available at a time when said user logged in to said virtual machine; and
   a virtual machine assign module configured to, in response to receiving a request for virtual machine resources from a requesting user, assign one of restored virtual machines which is idle based on checking whether said requesting user has used a virtual machine before, and compare one or more applications previously used by said requesting user in said virtual machine with one or more applications running on said restored virtual machines to determine a virtual machine that best matches needs of said requesting user.

10. The apparatus according to claim 9, wherein:
    said record module is further configured to locally execute a backup of said original files according to said types of file operations; and
    said virtual machine restore module is further configured to restore said virtual machine back to the original state using said backup of said original files.

11. The apparatus according to claim 10, wherein said record module is further configured to:
    in response to said type of file operations being at least one of to delete or to modify files, execute a backup of said original files and record the backup path of said original files; and in response to said type of file operations being to create files, record the path for creating said files.

12. The apparatus according to claim 10, wherein said virtual machine restore module is further configured to:
in response to said type of file operations being to delete files, use said back up of said original files to recover said original files;
in response to said type of file operations being to modify files, use said backup of said original files to replace said modified original files; and
in response to said type of file operations being to create files, delete said created files.

13. The apparatus according to claim 9, wherein said record module is further configured to record applications used by said user in said virtual machine.

14. The apparatus according to claim 13, wherein said record module is further configured to record applications running on said virtual machine which is idle and restored back to the original state.

15. The apparatus according to claim 9, wherein said virtual machine restore module is further configured to backup said at least one user's personal data in said virtual machine.

* * * * *